United States Patent [19]
Olson et al.

[11] Patent Number: 5,826,070
[45] Date of Patent: Oct. 20, 1998

[54] APPARATUS AND METHOD FOR MAINTAINING STATUS FLAGS AND CONDITION CODES USING A RENAMING TECHNIQUE IN AN OUT OF ORDER FLOATING POINT EXECUTION UNIT

[75] Inventors: Christopher Hans Olson, Austin; Jeffrey Scott Brooks, Round Rock; Martin Stanley Schmookler, Austin, all of Tex.

[73] Assignee: International Business Machines Corporation, Armonk, N.Y.

[21] Appl. No.: 708,006

[22] Filed: Aug. 30, 1996

[51] Int. Cl.$^6$ ..................................................... G06F 9/302
[52] U.S. Cl. ...................... 395/563; 395/393; 395/800.23
[58] Field of Search ...................................... 395/392, 393, 395/394, 562, 563, 800.23, 800.41, 800.42

[56] References Cited

U.S. PATENT DOCUMENTS

| | | | |
|---|---|---|---|
| 4,992,938 | 2/1991 | Cocke et al. | 364/200 |
| 5,197,135 | 3/1993 | Eickemeyer et al. | 395/393 |
| 5,452,426 | 9/1995 | Papworth et al. | 395/375 |
| 5,471,633 | 11/1995 | Colwell et al. | 395/800 |
| 5,497,493 | 3/1996 | Colwell et al. | 395/800 |
| 5,497,499 | 3/1996 | Garg et al. | 395/800 |
| 5,499,352 | 3/1996 | Clift et al. | 395/412 |
| 5,500,943 | 3/1996 | Ho et al. | 395/394 |
| 5,546,554 | 8/1996 | Yung et al. | 711/203 |
| 5,590,295 | 12/1996 | Doesaran et al. | 395/393 |
| 5,613,132 | 3/1997 | Clift et al. | 395/393 |
| 5,630,157 | 5/1997 | Dwyer, III | 395/800.23 |
| 5,632,023 | 5/1997 | White et al. | 395/394 |
| 5,640,578 | 6/1997 | Balmer et al. | 395/562 |
| 5,640,588 | 6/1997 | Vegesna et al. | 395/800.23 |
| 5,649,225 | 7/1997 | White et al. | 395/800.23 |
| 5,673,426 | 9/1997 | Shen et al. | 395/591 |

OTHER PUBLICATIONS

Farkas et al., Register File Design Considerations in Dynamically Scheduled Processors, Proceedings of the 2nd Int'l Symposium on High-Performance Computer Architecture, IEEE, pp. 40–51, Feb. 1996.

Williams et al., SPARC64: A 64–b 64–Active–Instruction Out–of–Order–Execution MCM Processor, IEEE Journal of Solid–state Circuits, vol. 30, No. 11, pp. 1215–1226, Nov. 1995.

Lightner et al., The Metaflow Lightning Chipset, Compcon Spring '91, IEEE, pp. 13–18, Mar. 1991.

Popescu et al., The Metaflow Architecture, IEEE Micro, vol. 11, No. 3, pp. 10–13, 63–73, Jun. 1991.

*Primary Examiner*—Krisna Lim
*Assistant Examiner*—Andrew Caldwell
*Attorney, Agent, or Firm*—Joseph C. Redmond, Jr.; John E. Hoel; Anthony V. S. England

[57] ABSTRACT

An apparatus and method reduces the number of rename registers for a floating point status and control register (FPSCR) in a superscalar microprocessor executing out of order/speculative instructions. A floating point queue (FPQ) receives speculative instructions and issues out-of-order instructions to FPQ execution units, each instruction containing a group identifier tag (GID) and a target identifier tag (TID). The GID tag indicates a set of instructions bounded by interruptible or branch instructions. The TID indicates a targeted architected facility and the program order of the instruction. The FPSCR contains status and control bits for each instruction and is updated when an instruction is executed and committed. A FPSCR renaming mechanism assigns an FPSCR rename to selected FPSCR bits during instruction dispatch from an instruction fetch unit (IFU) to the FPQ when an arithmetic instruction is dispatched that has a GID which has not been committed by instruction dispatch unit (IDU) and does not already have an FPSCR rename assigned, as determined by the FPQ. The FPSCR rename mechanism utilizes the TID upon the presence of selected bits in the FPSCR. The bits in the FPSCR rename are updated as a new arithmetic instruction enters a writeback stage in the FPU. The resulting FPSCR updates of all instructions in a given GID are merged into one FPSCR rename register. A FPSCR rename register exists for each GID rather than a FPSCR rename register for each FPR rename register as in the prior art.

10 Claims, 9 Drawing Sheets

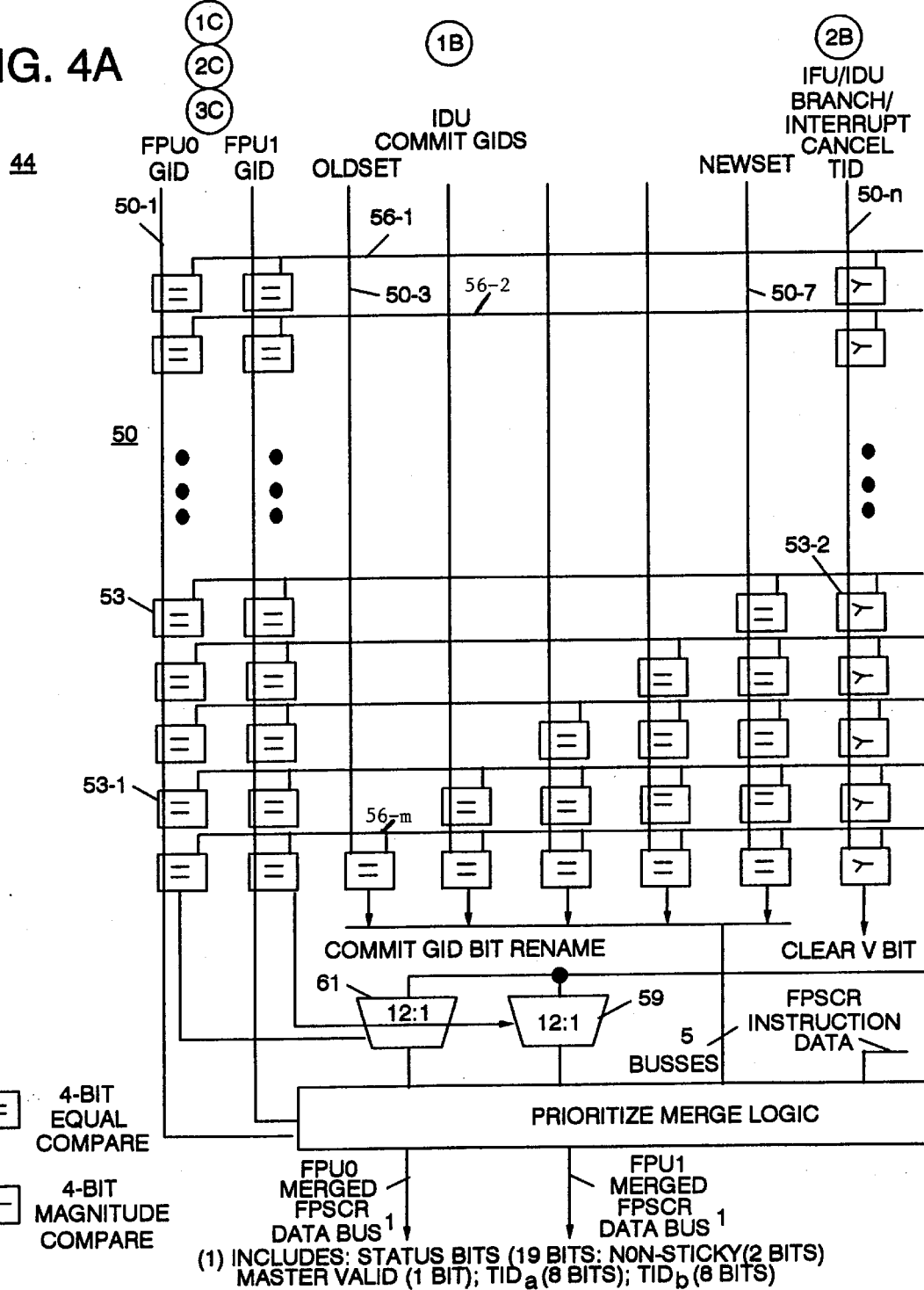

| FIG. 4A | FIG. 4B |

APPARATUS AND METHOD FOR MAINTAINING STATUS FLAGS AND CONDITION CODES USING A RENAMING TECHNIQUE IN AN OUT OF ORDER FLOATING POINT EXECUTION UNIT

BACKGROUND OF INVENTION

1. Field of the Invention

This invention relates to architecture for superscalar microprocessors. More particularly, the invention relates to maintaining status flags and condition codes using a renaming technique which reduces chip area and power requirements in a floating point unit capable of speculative and out of order execution.

2. Description of the Prior Art

Implementing a floating point system as defined in ANSI/IEEE Standard 754-1985 "IEEE Standard for binary floating point arithmetic" (IEEE Standard) requires that a status flag be provided for each type of exception. If set, a status flag indicates the specified exception (such as overflow) has occurred. The IEEE Standard also specifies that the result of a comparison between two floating point numbers shall be delivered as a condition code identifying the relation, or as a true-false response to a predicate that names the specific comparison desired. If a floating point unit is implemented with in-order and non-speculative instruction execution, the handling of status flags and comparison results (hereinafter referred to as "status bits") is straightforward. The last instruction to execute simply sets the appropriate status bits. However, a floating point unit utilizing out of order and/or speculative instruction execution for performance reasons presents a problem. The status bits visible to the user must be maintained in program order, appearing to the user as if all instructions were executed serially.

There are two current practices for overcoming this problem:

1. Store the status bits with the operation results in a floating point general purpose rename register.

2. Store the status bits in a separate register file containing multiple entries of status bit rename registers. For control logic simplification reasons, the register file would likely contain the same number of entries as there are floating point rename registers.

Using one of the two current practices, when a floating point operation result is generated and stored in a floating point rename register, the corresponding status bits are either stored along with the operation result in the floating point rename register, or in a separate register file. When the result of the operation is committed to an architected floating point register (FPR), the corresponding status bits are also committed to the architected status register.

The problem with the two current approaches are the area and power consumption implications caused by allocating individual storage locations for the status bits of each floating point operation result that has not been committed to the architected register set. The trend in superscalar implementations is to add more floating point execution units, requiring additional floating point rename registers, and often an equivalent number of rename registers for status bits. As superscalar designs continue to expand adding additional execution units and rename registers, a technique is required that significantly reduces the number of rename registers required for status bits.

Prior art related to the problem addressed by the present invention is as follows:

U.S. Pat. No. 4,992,938 issued Feb. 12, 1991, discloses an instruction control mechanism for a floating point processor which utilizes register renaming such that loads and stores are processed in parallel with arithmetic instructions. Architected registers are mapped to physical registers upon the creation of a new value for the architected register. This occurs both for load instructions as well as arithmetic instructions.

U.S. Pat. No. 5,497,499 issued Mar. 5, 1996, filed Mar. 19, 1992, discloses instruction scheduling, including register renaming for out of order instruction issuing for superscalar RISC computers.

U.S. Pat. No. 5,499,352 issued Mar. 12, 1996, filed Sep. 30, 1993, discloses an apparatus and method of utilizing register alias tables for renaming logical registers and integer registers. By utilizing the integer and floating point register alias tables, the registers of a relatively constrained architecture register set may be renamed into an expanded set of physical registers to increase instruction and operation processing of a superscalar microprocessor that can execute in an out of order or speculative manner.

U.S. Pat. No. 5,497,493 issued Mar. 5, 1996, filed Dec. 29, 1993, discloses, a microprocessor architecture for increasing processing efficiency within microprocessors having a limited number of registers by providing register renaming ability and selective right shifting of data from non-right adjusted registers, and specifically high-byte registers, before executing operations.

U.S. Pat. No. 5,452,426 issued Sep. 19, 1995, filed Jun. 4, 1994, discloses a method to coordinate instruction source data from the speculative and committed state resources in a processor performing speculative/out of order instruction execution, in which an instruction comprising at least one logical register source generates a physical register source by renaming the logical register source such that the physical register source specifies a physical register of a committed state register.

U.S. Pat. No. 5,471,633 issued Nov. 28, 1995, filed Sep. 30, 1993, discloses an apparatus for renaming a current set of logical registers to a current set of physical registers of an extended register set and selectively overriding partial stalls of the renaming apparatus to increase processing efficiency of a microprocessor.

None of the above-cited prior art directly or indirectly addresses or solves the problem of reducing the number of rename registers for maintaining status flags and condition codes in an out of order/speculative floating point execution unit whereby the chip area and power requirements of such processors are reduced.

SUMMARY OF THE INVENTION

An object of the invention is a superscalar microprocessor having reduced chip area and power requirements for status bit rename registers.

Another object is an improved floating point execution unit using out of order/speculative instruction execution and having a reduced number of status bit rename registers.

Another object is an apparatus and method for reducing the number of status bit rename registers in a floating point execution unit using out of order/speculative instructions.

Another object is an apparatus and method for merging status bit rename registers in an out of order/speculative floating point execution unit.

Another object is an apparatus and method for implementing IEEE Standard 754 in an out of order/speculative floating point execution unit having a reduced number of status bit rename registers.

These and other objects, features and advantages are achieved in a floating point processor capable of speculative/out of order execution. The processor includes a floating point register (FPR) array; a floating point status and control register (FPSCR) rename mechanism; a FPR rename mechanism and a floating point instruction queue (FPQ) for receiving instructions containing a group identifier tag (GID) and a target identifier tag (TID). The GID defines a set of instructions bounded by interruptible or branch instructions. Each instruction in the GID contains a TID which identifies the target architected facility of the instruction and is used to maintain program order. The floating point instruction queue is a six-element instruction/control queue. It holds store and arithmetic instructions that are dispatched to the floating point unit from the instruction queue in an Instruction Fetch Unit (IFU). Each FPQ element contains a fully decoded instruction field, target and source physical register numbers, and store control data. Each new instruction dispatched to the floating point unit has its target register assigned to a unique physical FPR location by the FPR rename mechanism. The FPR rename logic is a table-driven pointer mechanism. It implements register renaming by extending the 32 architected FPR registers to 64 physical registers. At any given time, 32 of the 64 floating point registers correspond directly to the architected register set. Those 32 physical registers that correspond to the architected set changes over time. The floating point register (FPR) array is a set of general purpose registers for the two floating point execution units (FPU0/FPU1). Each execution unit requires up to three source operands (A, B, C) for each instruction issued, therefore, 6 read ports are provided. In addition to write ports for each execution unit's target register, a write port is provided for loads. The floating point status and control register (FPSCR) contains the status and control bits for the floating point unit. The FPSCR implements the IEEE standard status flags and condition codes. Because the FPSCR delivers comparison results in the form of a condition code, and not as a true-false response (the IEEE standard allows the implementation to choose one of the two approaches), the present invention focuses on the condition code. However, the same technique would apply to the true-false response defined in the IEEE standard, or to any implementation specific status bits. A rename mechanism is required for some of the FPSCR bits and for the FPRs because the FPU utilizes out of order and speculative execution. The FPSCR renaming is less complex than the floating point register renaming because the FPSCR is architecturally a single register while there are 32 architected floating point registers. Only one FPSCR rename register is required per GID. All instructions within a GID will merge their FPSCR updates into one FPSCR rename. With one rename register for each GID, the number of FPSCR rename registers is significantly less than the number of FPSCR rename registers which would be otherwise required in prior art systems. Providing one FPSCR rename register per GID allows the FPSCR renames to retire at the same rate as the GID. Therefore, no interlocks are required and the FPU will not stall due to unavailable FPSCR renames.

DESCRIPTION OF THE DRAWINGS

The invention will be more fully understood from the following description of preferred embodiment and drawing, in which.

DESCRIPTION OF A PREFERRED EMBODIMENT

Figure 1:
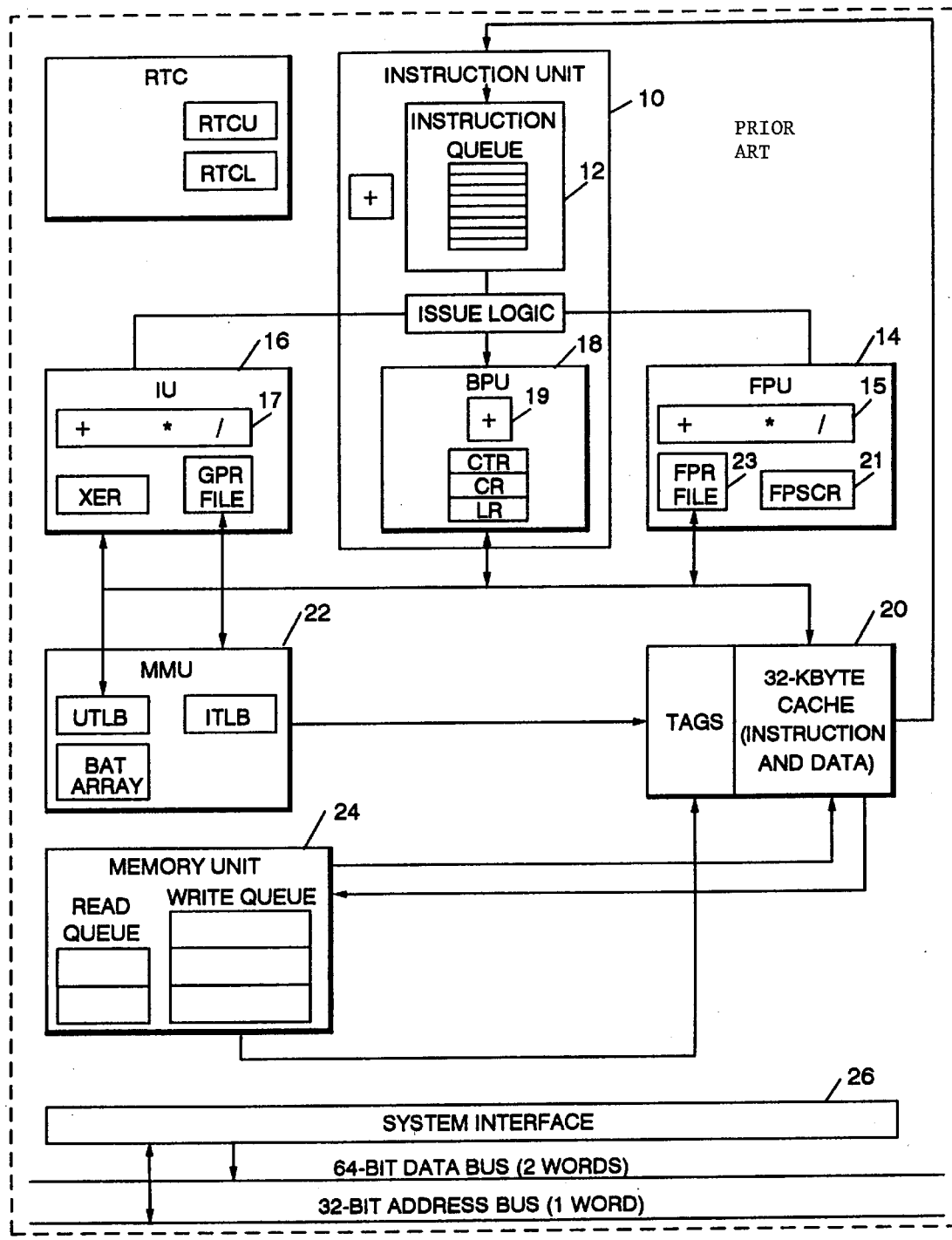
FIG. 1 is a block diagram of basic hardware elements in a prior art superscalar microprocessor.

In FIG. 1, a prior art superscalar microprocessor is shown as background for the present invention. An instruction unit 10 contains an instruction queue 12 and provides centralized control of instruction flow to independent Floating Point Execution Unit (FPU) 14, Integer Execution unit (IE) 16 and Branch Processing Execution Unit (BPU) 18. The BPU unit 18 performs condition register (CR) lookahead operations on conditional branches. The unit 18 looks through the bottom half of the instruction for a conditional branch instruction and attempts to resolve it early, achieving the effect of a zero cycle branch in many cases. The FPU unit 14 uses a bit in the instruction encoding to predict the direction of the conditional branch. Therefore, when an unresolved conditional branch instruction is encountered, the processor fetches instruction from the predicted target stream until the conditional branch is resolved: The BPU unit 18 contains an adder 19 to compute branch target addresses and three special purpose user control registers: a link register (LR), a count register (CTR), and a condition register (CR). The BPU unit 18 calculates the return pointer for subroutine calls and saves it into the LR for certain types of branch instructions. The LR also contains the branch target address for the branch conditional to link register instruction. The counter register contains a branch target address for the branch conditional to count register instruction. The content of the LR and CTR can be copied to or from any general purpose register (GPR). Because the BPU unit 18 uses dedicated registers rather than general purpose or floating point registers, execution of branch instructions is largely independent from execution of integer and floating point instructions.

The integer unit 16 executes all integer instructions and executes floating point memory accesses in concert with the floating point unit (FPU) 14. The unit 16 executes one integer instruction at a time, performing computations with its arithmetic logic unit 17, integer exception register (XER) and a general purpose register (GPR) file. Most integer instructions are single cycle instructions. The IE unit 16 interfaces with a cache 20 and a memory management unit (MMU) 22 for all instructions that access memory. Addresses are formed by adding the source 1 register operand specified by the instruction to either a source 2 register operand or to a 16 bit, immediate value imbedded in the instruction. Load and store instructions are issued and translated in program order; however, the accesses can occur out of order. Synchronizing instructions are provided to enforce the strict order.

The floating point unit (FPU) 14 contains a single precision multiply add array 15, a floating point status and control register (FPSCR) 21 and 32 64-bit floating point registers 23. The multiply-add array allows the microprocessor to efficiently implement floating point operations such as multiply, add, divide, and multiply-add. The floating point processing unit is pipelined so that most single precision instructions and many double precision instructions can be issued back-to-back. The floating point unit contains two additional instruction queues. These queues allow floating point instructions to be issued from the instruction queue even though the floating point unit is busy, making instructions available for issue to the other execution units. Like the unit 18, the floating point unit can access instructions from the bottom half of the instruction queue which permits floating point instructions that do not depend on unexecuted instructions to be issued early to the floating point unit.

The memory management unit MMU 22 controls access privileges to virtual and physical memory. The MMU is supported by a cache (UTLB) of most recently used page table entries; a four entry array (BAT) that maintains translations for blocks of memory, and a register (ITLB) copies of the most recently used instruction without requiring the UTLB or the BAT array. The instruction unit 10 generates all instruction addresses; these addresses are both for sequential instruction batches and addresses that correspond to a change of program flow. The integer unit 16 generates addresses for data accesses (both for memory and an I/O controller interface, not shown).

After an address is generated, the upper order bits of the logical address are translated by the MMU 22 into physical address bits. Simultaneously, the lower order address bits are directed to the on chip cache 20 where they form the index into an eight-way set associative tag array. After translating the address the MMU passes the higher order bit so the physical address to the cache and the cache look-up completes. For cache inhibited accesses or accesses that miss in cache, the untranslated lower order address bits are concatenated with the translated higher order address bits. The resulting 32 bit physical address is then used by a memory unit 24 and a system interface 26 which accesses the external memory 24. The MMU also directs the address translation and enforces the protection hierarchy program by the operating system in relation to the supervisor/user privilege level of the access in relation to whether the access is a load or store.

The cache 20 provides an eight-word interface to the instruction fetcher and load store unit. The surrounding logic selects, organizes, and forwards the requested information to the requesting unit. Write operation to the cache can be performed on a byte basis; a complete read-modify-write operation to the cache can occur in each cycle. The instruction unit 10 provides the cache with the address of the next instruction to be fetched. In the case of a cache hit, the cache returns the instruction and as many of the instructions following it as can be placed in the eight-word instruction queue-up to the cache sector boundary. If the queue is empty, as many as eight words can be loaded into the queue in parallel.

A memory unit 24 contains read and write queues that buffer operations between the external interface and the cache. These operations are comprised of operations resulting from load and store instructions that are cache misses and read and write operations required to maintain cache coherency, table search, and other operations. The memory unit also handles address only operations and cache inhibited loads and store.

A system interface 26 provides burst read memory operations, followed by burst write memory operations, I/O controller interface operations, and single beat memory read and write operations. Additionally, there can be address only operations, variance of the burst and single beat operations and address re-try activity.

Figure 2:
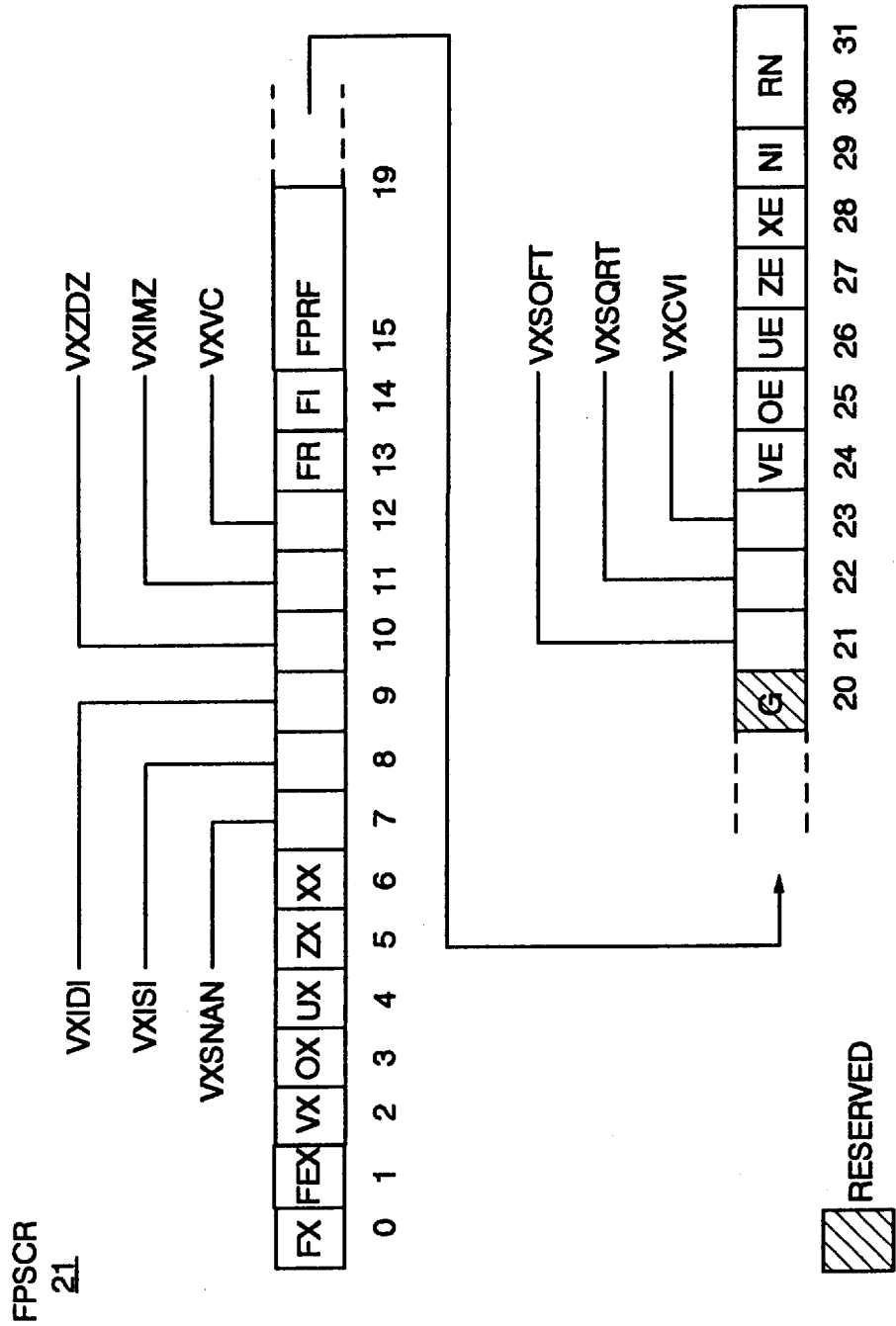
FIG. 2 is a representation of a floating point status and control register (FPSCR) for the floating point unit of FIG. 3.

In FIG. 2 a floating point status and control register 21 included in the floating point unit 14 is shown in more detail. The register 21 contains bits to do the following:

a. Record exceptions generated by floating point operations.

b. Record the type of the result produced by floating point operations.

c. Control the rounding mode used by floating point operations.

d. Enable or disable the reporting of exceptions (invoking the exception and exception handler).

Bits 0–23 are status bits. Bits 24–31 are control bits. Bits in the FPSCR are updated at the completion of an instruction's execution.

The exception bits in the FPSCR (bits 0:12, 21:23) are sticky, except for the floating point enabled exception summary (FEX) and the floating point invalid operation exception summary (VX). That is, once set, sticky bits remain set until they are cleared by a move to FPSCR instruction (MTFPSCR).

A listing of FPSCR bit settings is shown in Appendix 1.

Figure 3:
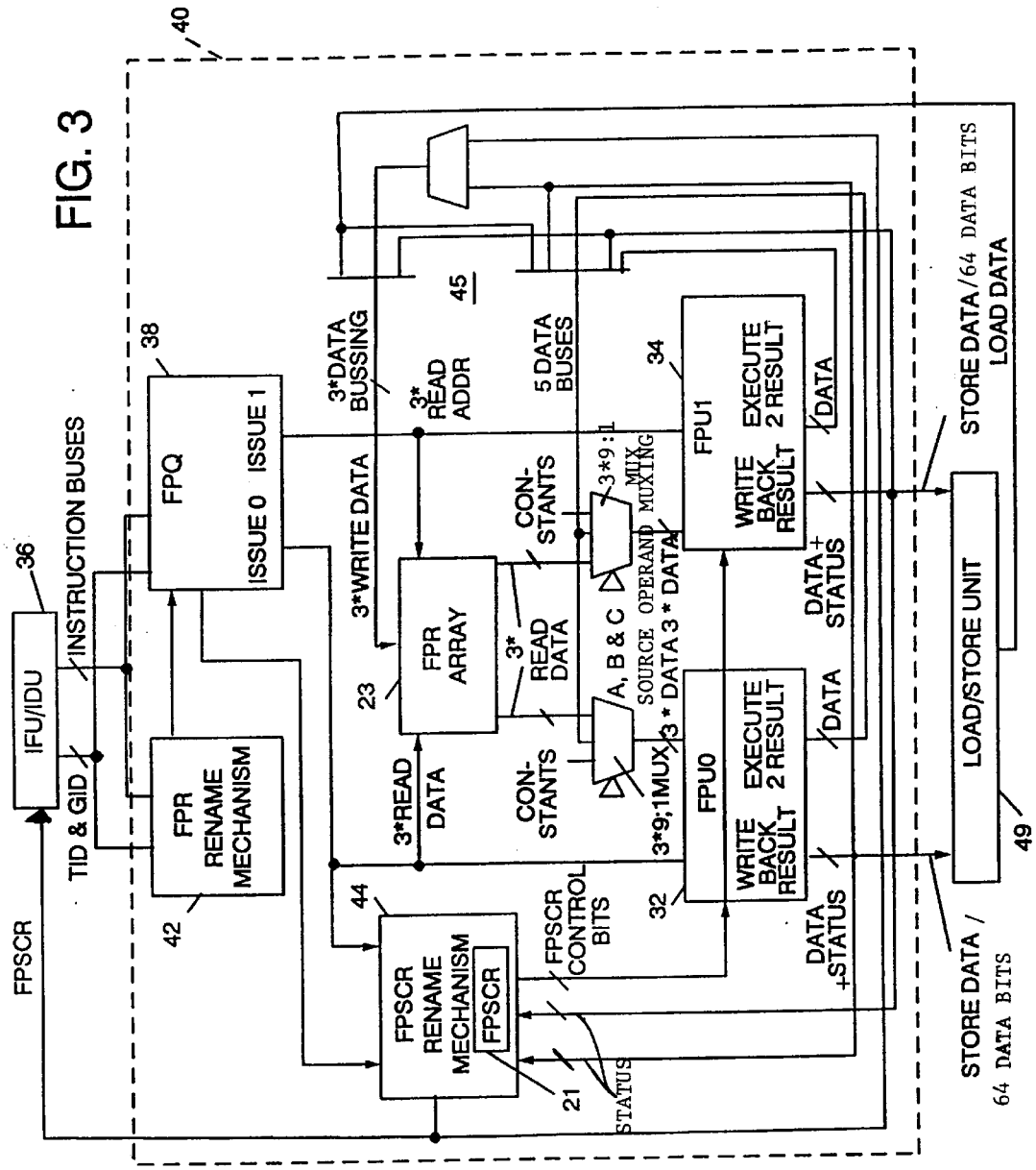
FIG. 3 is a high-level block diagram of a floating point unit incorporating the principles of the present invention.

In FIG. 3, a high-level diagram of a floating point unit 40 is shown with dual identical execution units 32, 34 which support out of order and speculative instruction execution. The floating point units conform to the ANSI/IEEE Standard 754-1985, "IEEE Standard for Binary Floating Point Arithmetic." All floating point operations conform to this standard, unless software sets the floating point Non-IEEE Mode (NI) bit 29 in the FPSCR 21.

Instructions are sent to the floating point unit from an instruction fetch/dispatch unit 36. The instructions are stored in a floating point queue 38 and issued to the floating point units execution units 32, 34. 64-bit double precision data for these instructions is stored in the floating point register (FPR) array 23. The floating point unit 40 comprises 6 major components. The components include a FPR rename mechanism 42 for the floating point registers 23; the floating point register array 23 itself, the floating point instruction queue 38, a floating point status and control rename mechanism 44 containing the architected FPSCR 21 and the execution units 32 and 34.

Each new instruction dispatched through the floating point unit 40 has its target register assigned to a unique physical floating point register location by the FPR rename mechanism 42. The rename logic is a table-driven pointer mechanism. It implements register renaming by extending the 32 architected floating point registers to 64 physical registers. At any given time, 32 of the 64 floating point registers correspond directly to the architected register set. These 32 physical registers that correspond to the architectural set changes over time.

The floating point instruction queue 38 is a six-element instruction/control queue. The queue holds store and arithmetic instructions that are dispatched to the floating point unit 40 from the instruction queue in the IFU 36. Each FPQ element contains a fully decoded instruction field, target and source physical register numbers and store control data.

The floating point register array 23 is a set of general purpose registers for the two floating point execution units 32 and 34. Each execution unit requires up to three source operands (A, B, C) for each instruction issued, therefore, six read ports are provided. In addition to write ports for each execution unit's target register, a write port is provided for loads.

The FPSCR 21 contains the status and control for the FPU 40; A rename mechanism is required for some of the FPSCR bits, as required for the FPRs, because the floating point unit utilizes out of order and speculative instruction execution. Floating point status and control register renaming is less complex than floating point register renaming because the FPSCR is architecturally a single register, while there are 32 architected FPRS. Only one FPSCR rename register is required per group identifier (GID). All instructions within a group identifier will merge their FPSCR updates into one FPSCR rename register. Given that 12 uncommitted GIDs are possible in the present embodiment, 12 FPSCR renames are ideal. This allows the FPSCR renames to retire at the same rate as the group identifiers. Therefore, no interlocks are required and the FPU will not stall due to unavailable FPSCR renames.

The two execution units 32 and 34 are identical. Each unit can execute all arithmetic instructions, including the divide and square root. The data flow in each unit is optimized to execute multiply-add instructions fast and efficiently. These units complete most instructions in two cycles. The units 32 and 34 provide their outputs for store data to a load/store unit 49 which can also return load data to the FPR.

The FPSCR rename mechanism 44 is required for some of the FPSCR bits because the floating point unit 40 utilizes out of order and speculative execution. FPSCR renaming allows FPSCR updates to be committed in program order and provides a means for discarding the results of speculatively executed instructions that are cancelled by the machine.

To handle speculative and out of order instructions, instruction tags called group identifiers (GID) and target identifiers (TID) are included with each instruction dispatched by the IFU/IDU 36. A unique group identifier (GID) tag is applied to a set of instructions bounded by interruptible or branch instructions. A TID tag identifies the target architected facility and the program order of the instruction. An FPSCR rename register is required for each uncommitted GID. All instructions within a GID merge their FPSCR updates and TID into one FPSCR rename register. In the prior art, a floating point status bit rename register was required for each floating point register rename. Thus, an FPU containing 32 floating point register renames would require 32 floating point status bit rename registers to handle out of order and speculative execution. In the present invention, the number of floating point status bit rename registers is reduced to the number of uncommitted group identifier tags permitted by the microprocessor. Accordingly, the number of floating point status bit rename registers may be reduced with savings in area and power requirements for the microprocessor.

An FPSCR rename is assigned during instruction dispatch for the following condition types:

1A. An arithmetic instruction is dispatched and has a GID which has not been committed, and 2A. The GID does not already have an FPSCR rename assigned.

The floating point instruction queue 38 which issues instructions to the floating point execution units 32 and 34 determines whether the GID has been committed and whether the GID already has an FPSCR rename assigned.

An FPSCR rename is cleared by any one of the following conditions types:

1B. The GID assigned to the rename is committed. The instruction dispatch unit 36 commits 0–5 of the oldest GIDs in a cycle. When an FPSCR rename is committed, the rename contents are merged with the existing architected FPSCR state.

2B. An interrupt or branch redirects the microprocessor. All new renames newer or equal to the redirection point are cleared.

As a new arithmetic instruction enters the write-back stage of the execution units 32 and 34, one of three condition types occur with its resulting FPSCR data:

1C. The instruction writes directly into the architected FPSCR. This occurs if its GID has previously or is currently committed. FPSCR data from one or both execution units 32 and 34, as well as FPSCR data from up to five committed renames may be merged into the architected FPSCR at a time.

2C. The instruction updates a new FPSCR rename. FPSCR data from on or both execution units 32 and 34 may be merged into the new FPSCR rename.

3C. The instruction results merge into an existing FPSCR rename. Both FPU's 32 and 34 may merge into the same existing rename.

Figures 4, 4B:
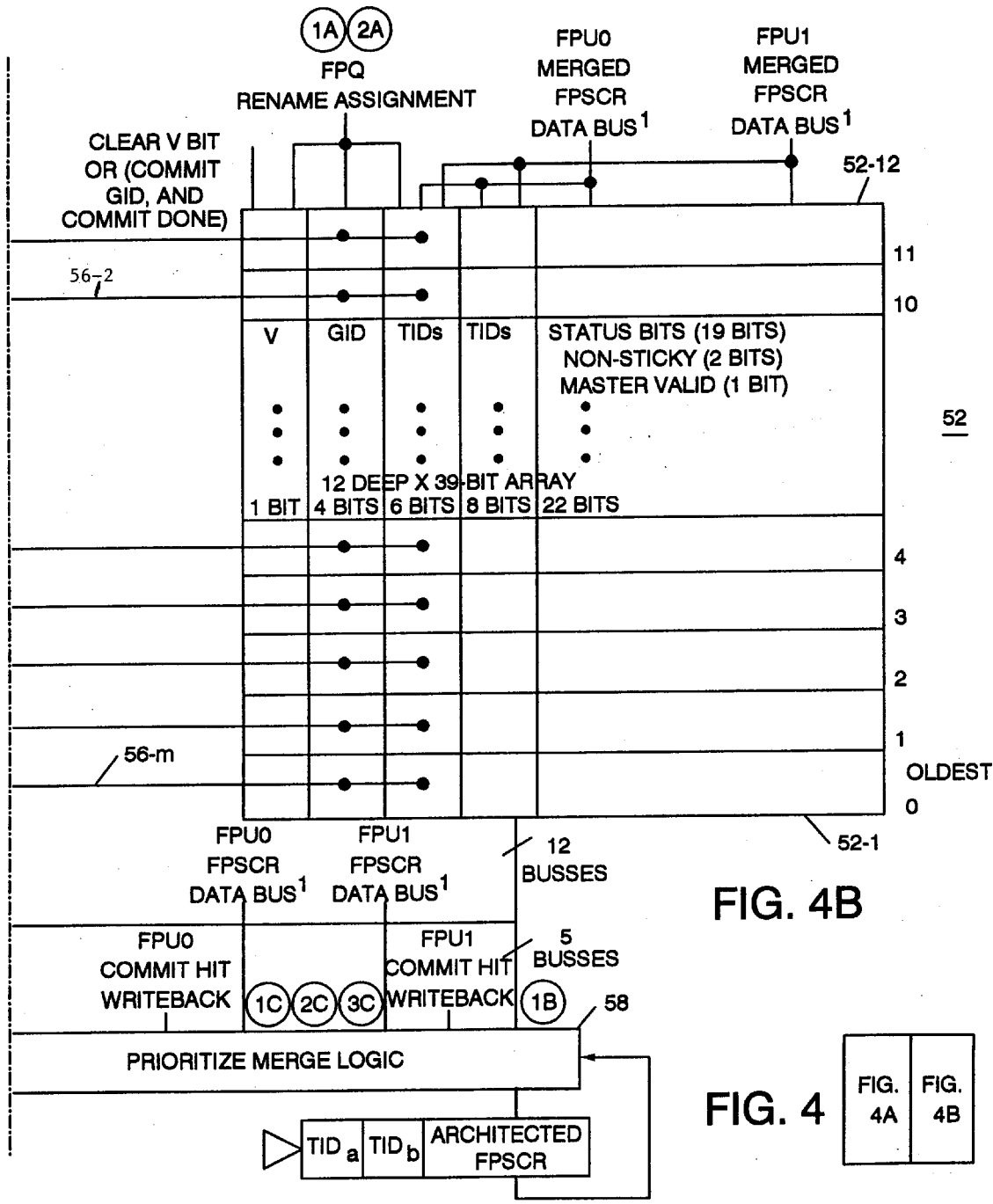
FIG. 4 is an assembly diagram of a FPSCR rename mechanism, shown in FIGS. 4A and B, and included in FIG. 3.

The above condition types will be referred to in describing the operation of the rename mechanism shown in FIG. 4.

Referring to Appendix 1, a total of 19 FPSCR bits require renaming. The 19 rename bits include all exception bits (3:12, 22:23), the rounded and inexact bits (13:14), and the result flags (15:19). For rename purposes, the FPSCR may be broken into five types:

1. Exception and enable control bits (20:21, 24:31). These bits are updated only by the move to FPSCR instructions. Renaming is not required for these bits. FPQ 38 serialization insures ordered updates of these bits.

2. Exception summary bits (0:2). These bits can be generated by information in the architected FPSCR and the FPSCR renames. Renaming is not required for these bits.

3. Rounded bit (13), inexact bit (14), and result flag bit (15). These bits should represent the results of the newest arithmetic instruction within the GID. These bits must be renamed, and a TID compare performed within the GID to insure the newest arithmetic result updates these bits. The TID of the newest arithmetic result for these bits is stored as TIDa.

4. Result bits (16:19). Same as type 3, with a different TID. The TID of the newest arithmetic result for these bits is stored as TIDb.

5. Exception bits (3:12, 22:23). These bits must be renamed, but because they are sticky bits, that is, once set, they remain set until they are cleared by a move instruction, a TID compare is not required to determine the newest value. The renamed FPSCR for a given GID will represent an OR for these exception bits.

In FIG. 4 the FPSCR rename mechanism 44 is shown in more detail. A rename compare matrix 50 interacts with a rename array 52. The matrix 50 includes a plurality of input columns 50-1 . . . 50-n where n in the present instance is 8 and a plurality of rows 56-1 . . . 56-m, where m in the present instance is 12, corresponding to the number of GIDs handled in the microprocessor. Selected rows and columns are interconnected by a logic element 53 according to the condition type inputs 1B . . . 3C (previously described) provided to the matrix 50. The type of logic element depends upon whether the input to a given compare matrix column is a GID (4-bit equal compare) or TID (6-bit magnitude compare).

The rename array 52 includes a plurality of rename registers 52-1 . . . 52-m where m is 12 in the present instance, corresponding to the number of GIDs handled in the microprocessor. Each rename register includes a series of fields in a 12 deep by 39 bit array. The fields included in each rename register, starting from the left, are as follows:

a. Valid data (1 bit)
b. Group identifier (4 bits)
c. Target identifier a (6 bits)
d. Target identifier b (6 bits)
e. Combined status bits (fields as follows: status (19 bits); non-sticky valid (2 bits); master valid (1 bit))

The valid bit; GID and TIDa fields are activated by the floating point queue 38 (see FIG. 3) when the arithmetic instruction is dispatched and the GID has not been committed and the GID does not already have an FPSCR rename assigned. The combined field is completed when a prioritized merge logic unit 58 provides the merged FPSCR data bus to the rename array.

The logic elements in columns 50-1 and 2 are 4-bit equal compare circuits 53-1 to select the matching FPSCR rename entry (if one exist) according to the rename conditions 1C, 2C and 3C described above.

The matrix columns 50-3 through 50-7 are coupled to the five oldest rename registers 52-1 through 52-5 by compare circuits 53-1 and commit the FPSCR rename register if the compare condition is true.

The logic elements in matrix column 50-8 are six-bit magnitude compare circuits 53-2 which, when the instruction fetch or dispatch units cancel a TID due to the interrupt or branch, act to clear the V bit to permit entry of a new rename into such register.

The output of the rename register appears in 12 buses which are provided as a first input to the prioritized merge logic circuit 58 through multiplexers 59, 61 for FPUs 32, 34 and respond to condition types 1C, 2C, and 3C. The five oldest renames are also provided as a second input for condition type 1B to the logic device 58. The floating point units 32 and 34 provide commit hit write back inputs to the logic device 58 as third and fourth inputs to indicate that the instruction which just completed execution and is entering writeback compared (hit) with a committing GID or previously committed GID. The floating point units 32 and 34 also provide the FPSCR data bus status for FPUs 32, 34 for condition rename types 1C, 2C and 3C as fifth and sixth inputs to the logic device 58. A move to FPSCR instruction and corresponding FPSCR data are provided as a seventh input to the logic device 58. Results of the five commit GID hit rename compares are provided as eighth thru twelfth inputs to the logic device 58 to select the appropriate five oldest renames. GIDs for instructions just finished executing in FPU0 and FPU1 are provided as thirteenth and fourteenth inputs to the logic device 58. Lastly, the current architected FPSCR with corresponding TIDa and TIDb are provided as a fifteenth input to the logic device 58.

Figure 5A:
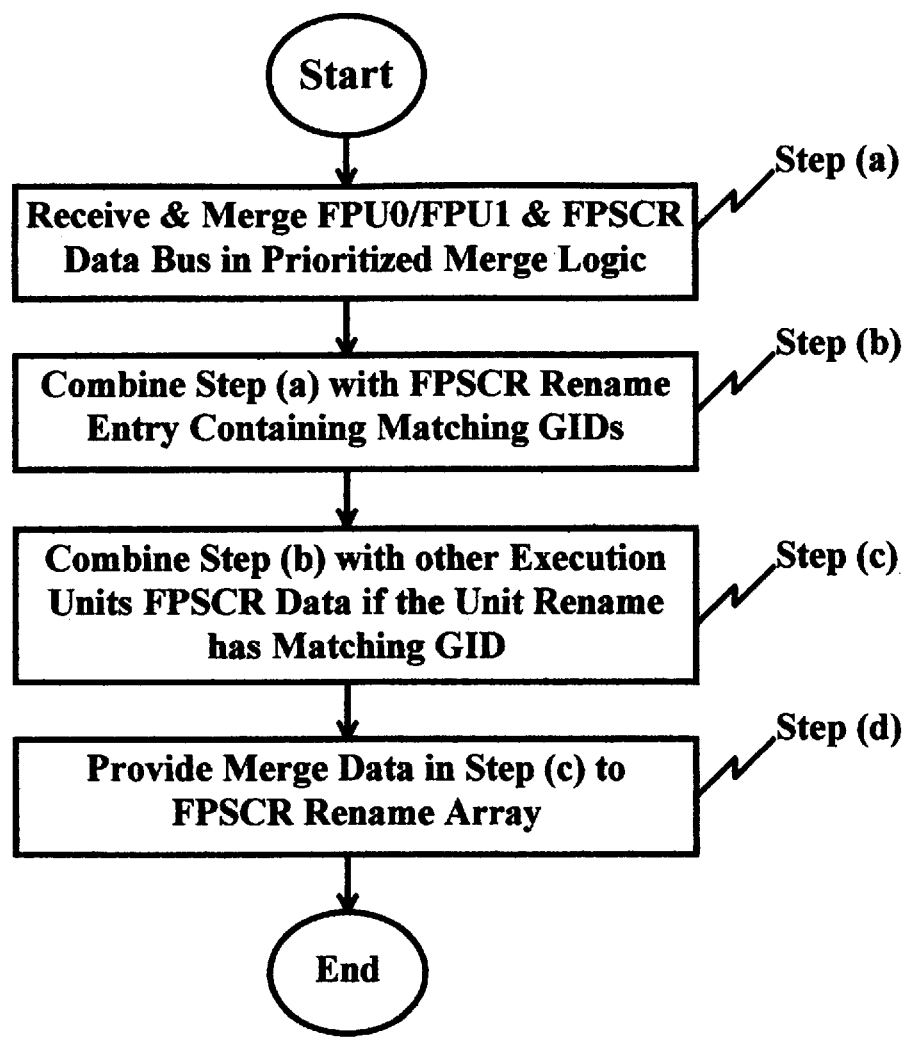
FIGS. 5A, B and C are flow diagrams for a priortize merge logic unit 58 included in FIGS. 4A and B.

There are three cases in which the prioritized merge logic 58 is used to create a merged FPSCR value, as shown in FIGS. 5A, B and C.
 a. FPSCR rename update
 b. Commit hit write-back (results in an architected FPSCR update)
 c. Commit GID hit rename (results in an architected FPSCR update)

Note that any combination of the above three cases may occur at the same time.

In FIG. 5A, for condition a) above, first merge FPU0/FPU1 FPSCR data bus with:
 i) FPSCR rename entry containing matching GID.
 ii) Other execution units FPSCR data (if it has matching GID).

Then provide newly merged data to the FPSCR rename array.

Figure 5B:
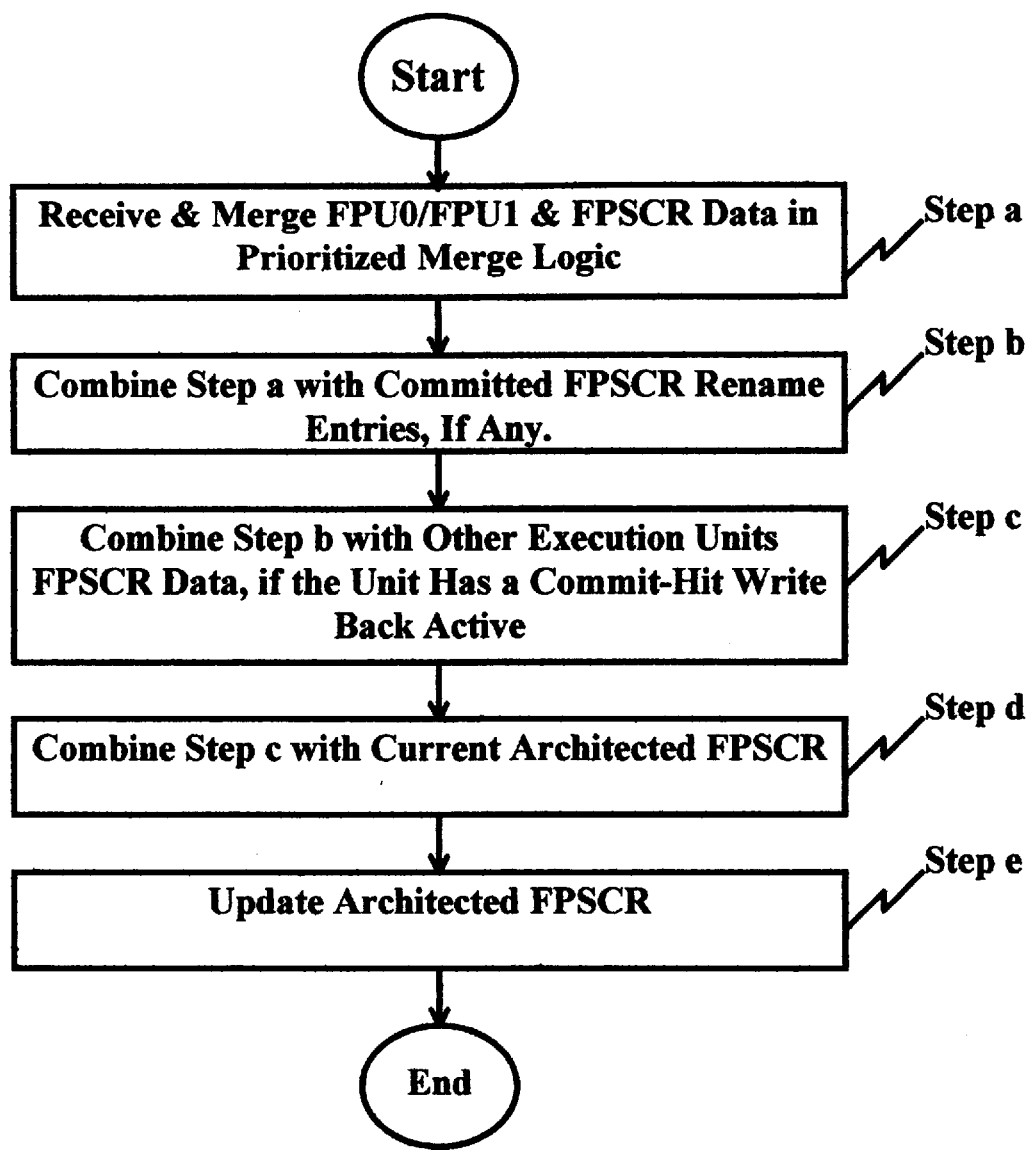

In FIG. 5B, for condition b) above, first merge FPU0/FPU1 FPSCR data bus with:
 i) FPSCR rename entry containing matching GID (if one exists).
 ii) Committing FPSCR rename entries (if any).
 iii) Other execution units FPSCR data (if it also has commit hit write-back active).
 iv) Current architected FPSCR.

Then update architected FPSCR.

Figure 5C:
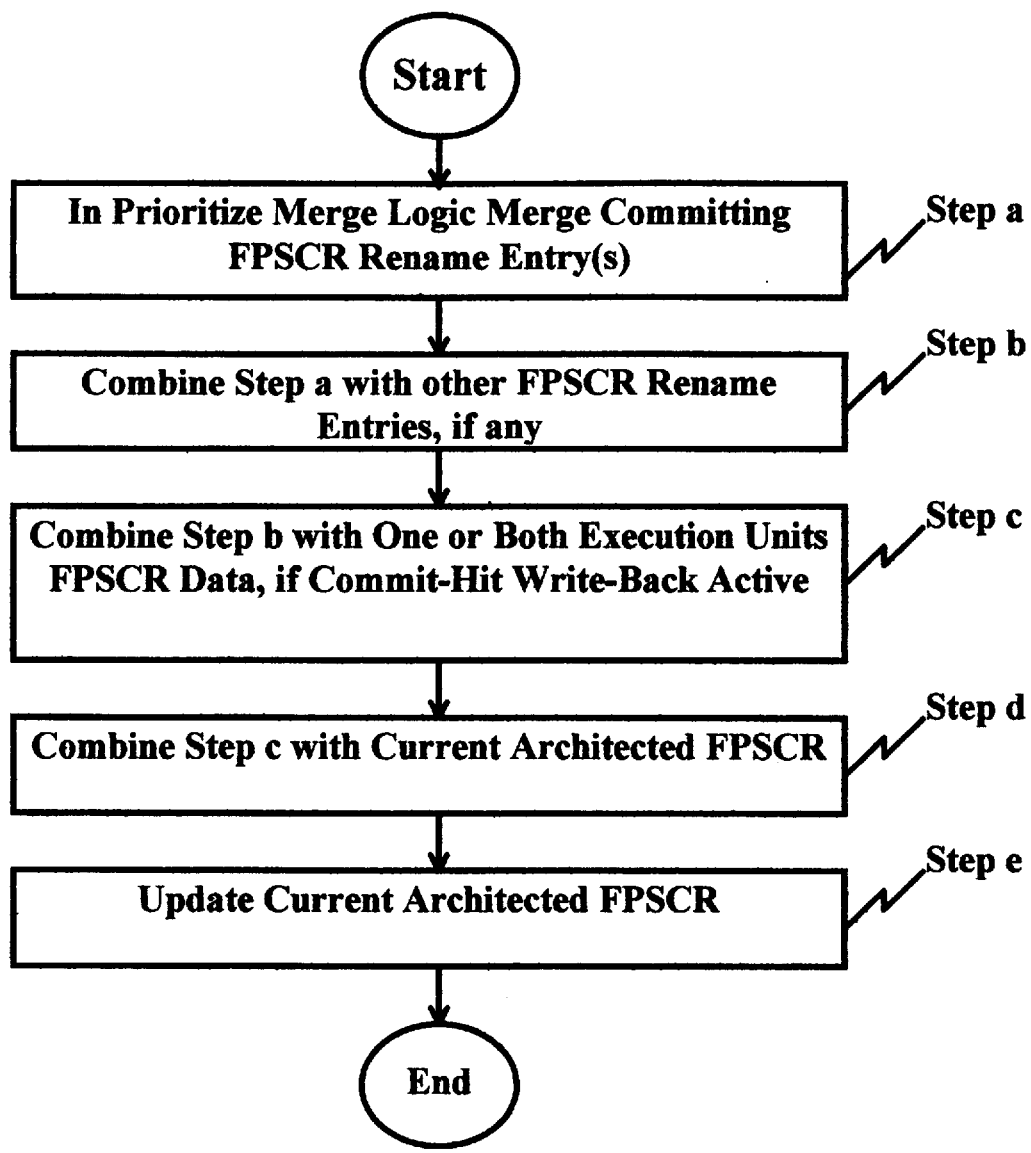
Figure 6:
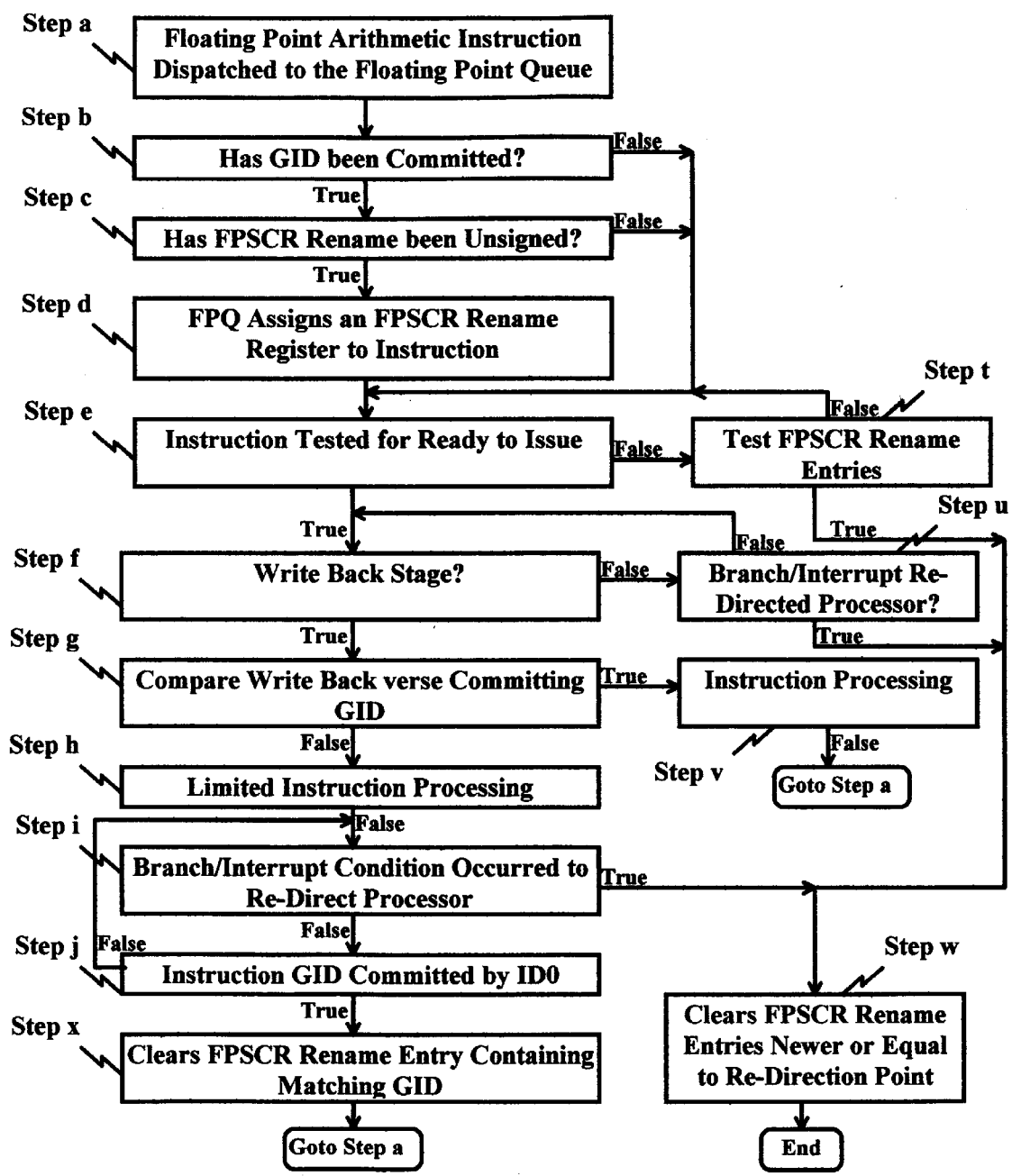
FIG. 6 is a flow diagram of a method of maintaining status flags and condition codes in the floating point unit of FIG. 3 using a rename technique which incorporates the principles of the present invention.

In FIG. 5, for condition c) above, first merge committing FPSCR rename entry or entries (up to five) with:
 i) Other committing FPSCR rename entries (if any).
 ii) One or both execution units FPSCR data (if they commit hit write-back active).
 iii) Current architected FPSCR.

Then update architected FPSCR.

The merge function can:
 i) Merge FPSCR rename entries and FPU0/FPU1 FPSCR data buses with the current architected FPSCR value to create a new architected FPSCR value.
 ii) Merge FPSCR rename entries and FPU0/FPU1 FPSCR data buses to provide newly merged data to the FPSCR rename array.

The merge function can be divided into three subsets: Merge A, Merge B, and Merge C.

Merge A provides newly merged data to the FPSCR rename array. It does not update the architected FPSCR (this function is provided by merge B/merge C logic). When an arithmetic instruction is finished executing and a commit hit write-back does not occur, the resulting FPSCR data (including status bits, non-sticky valids, master valid, TIDa and TIDb) is merged with a) the FPSCR rename entry containing the matching GID, and b) the other execution units FPSCR data (if it has a matching GID) where TIDa and TIDb have been previously defined above in connection with types three and four FPSCR renames.

The merge A process is as follows:
 a) Sticky bits, that is those bits which appear in the FPSCR (See FIG. 2) and once set remain set until they are cleared by a move instruction, are validated with the master valid bit. All valid sticky bits are ORed together.
 b) Non-sticky bits are validated with the master valid bit and the appropriate non-sticky valid. The newest (as determined by the TIDa/TIDb) valid non-sticky bit has priority for each of the non-sticky bits.

Merge B logic merges all committing FPSCR data together. This includes any combination of a) one or both execution units FPSCR data if commit hit write-back is active, and b) all committing rename entries (0–5 of them).

The merge B process is as follows:
 a) Sticky bits are validated with the master valid bit. All valid sticky bits are ORed together.
 b) Non-sticky bits are validated with the master valid bit and the appropriate non-sticky valid. The newest (as determined by TIDa/TIDb) valid non-sticky bit has priority for each of the non-sticky bits output from merge B logic.

Merge C logic merges the merge B output with the current architected FPSCR value and then updates the architected FPSCR.

The merge C process is as follows:
 a) Non-sticky bits are multiplexed with the current architected FPSCR value. The current architected FPSCR value is selected if the sticky bit output from the merge B logic is not valid, or if the current architected FPSCR has a newer non-sticky bit (as determined by TIDa/TIDb).

The architected FPSCR may have a newer non-sticky bit in the case of a commit hit write-back where the corresponding GID has previously committed.

b) OR the sticky bits from merge B with the current architected FPSCR value.

c) Generate the three summary bits (FPSCR [FX, FEX, VX]).

The logic device 58 provides an output to the architected FPSCR including updated target identifiers (TIDa) and (TIDb) for return to the logic device 58 as described above and provides the merged FPSCR data buses for the execution units 32 and 34 which are returned as inputs to the array 52.

In FIG. 5, a flow diagram describes the steps in handling a floating point arithmetic instruction from dispatch to commit or cancel. The process in FIG. 5 will be described in conjunction with FIG. 3.

In step a, a floating point arithmetic instruction is dispatched to the floating point queue 38. The instruction includes the TID/GID instruction tags from the Instruction Fetch and Dispatch Units (IFU/IDU) 36.

In step b, a test is made to determine whether the GID has not been committed. A "true" condition initiates step c. A "false" condition jumps the instruction to step e.

In step c, a test is made to determine whether an FPSCR rename has not been assigned. A "true" condition initiates step d. A "false" condition jumps the instruction to step e.

In step d, the FPQ 38 assigns an FPSCR rename register to the instruction.

In step e, the instruction is tested to determine if it is ready to issue or should be held in the FPQ 38. A "true" condition issues the arithmetic instruction to one of the execution units 32 or 34. A "false" condition jumps the machine to step t in which a test is made to determine if a branch/interrupt condition has redirected the processor.

In step t, a "true" condition which initiates step w clears all FPSCR rename entries newer or equal to the re-direction point whereupon the process returns to step a. A "false" condition in step t returns the instruction to step e for further processing.

In step f, a test is made to determine whether the arithmetic instruction has finished executing and is entering a write back stage in execution units 32 or 34. A "true" condition initiates step g. A "false" condition jumps the machine to step u to determine if a branch/interrupt condition has redirected the processor. In step u, a "true" condition initiates step w which clears all FPSCR rename entries newer or equal to the redirection point and returns the machine to step a. In step u, a "false" condition returns the instruction to step f for further processing.

In step g, a test is made to determine if a commit write back of the instruction occurred. In step g, the instruction in write back is compared against a committing GID from the IDU and previously committed GIDs. A "false" condition initiates step h. A "true" condition initiates step v in which the instruction is subject to one or more of the following operations:

(i) Merge with FPSCR rename entry containing matching GID (if one exists).

(ii) Merge with other committing FPSCR rename entries (if any).

(iii) Merge with other execution units FPSCR data (if it also has commit write back).

(iv) Merge with current architected FPSCR.

(v) Update architected FPSCR.

(vi) Clear the FPSCR rename entry containing matching GID (if one existed). Upon completion of the operation (s) the process returns to step a.

In step h, the instruction is subject to one or more of the following operations:

(i) Merge with the FPSCR rename entry containing matching GID.

(ii) Merge with other execution units FPSCR data (if it has matching GID).

(iii) Update FPSCR rename entry.

Step i is initiated upon completion of step h. In step i, a test to determine whether a branch/interrupt condition has occurred to redirect the processor. A "true" condition initiates step w which clears all FPSCR rename entries newer or equal to the redirection point. A "false" condition initiates step j to determine if the instructions GID is committed by the instruction dispatch unit. A "false" condition returns the process to step i. A "true" condition initiates step x in which the instruction is subject to one or more of the following operations:

(i) Merge with other committing FPSCR rename entries (if any).

(ii) Merge with one or both execution units FPSCR data (if they have commit write back).

(iii) Merge with current architected FPSCR.

(iv) Update architected FPSCR.

(v) Clear the FPSCR rename entry containing matching GID. Upon completion of one or more of the operations in step x, the process is returned to step a.

While the invention has been described in terms of a preferred embodiment, is apparent that various modifications may be made in the spirit and scope of the invention which is to be limited only in terms of the appended claims, as follows:

APPENDIX I

| Bit(s) | Name | Description |
|---|---|---|
| 0 | FX | Floating-point exception summary (FX). Every floating-point instruction implicity sets FPSCR[FX] if that instruction causes any of the floating-point exception bits in the FPSCR to transition from 0 to 1. The mcrfs instruction implicity clears FPSCR[FX] if the FPSCR field containing FPSCR[FX] is copied. The mtfsf, mtfsfi, mtfsb0, and mtfsb1 instructions can set or clear FPSCR[FX] explicity. This is a sticky bit. |
| 1 | FEX | Floating-point enabled exception summary (FEX). This bit signals the occurence of any of the enabled exception conditions. It is the logical OR all the floating-point exception bits masked with their respective enable bits. The mcrfs instruction implicity clears FPSCR[FEX] if the result of the logical OR described above becomes zero. The mtfsf, mtfsfi, mtfsb0, and mtfsb1 instructions cannot set or clear FPSCR[FEC] explicity. This is not a sticky bit. |
| 2 | VX | Floating-point invaild operation exception summary (VX). This bit signals the occurence of any invalid operation exception. It is the logical OR of all of the invalid operation exceptions. The mcrfs instruction implicitiy clears FPSCR[VX] if the result of the logical OR described |

APPENDIX I-continued

| Bit(s) | Name | Description |
|---|---|---|
|  |  | above becomes zero. The mtfsf, mtfsfi, mtfsb0, and mtfsb1 instructions cannot set or clear FPSCR[VX] explicitly. This is not a sticky bit. |
| 3 | OX | Floating-point overflow exception (OX). This is a sticky bit. See Section 5.4.7.4., "Overflow Exception Condition." |
| 4 | UX | Floating-point underflow exception (UX). This is a sticky bit. See Section 5.4.7.5, "Underflow Exception Condtion." |
| 5 | ZX | Floating-point zero divide exception (ZX). This is a sticky bit. See Section 5.4.7.3., "Zero Divide Exception Condition." |
| 6 | XX | Floating-point inexact exception (XX). This is a sticky bit. See Section 5.4.7.6, "Inexact Exception Condition." |
| 7 | VXSNAN | Floating-point invalid operation exception for SNaN (VXSNAN). This ia a sticky bit. See Section 5.4.7.2, "Invalid Operation Exception Conditions." |
| 8 | VXISI | Floating point invalid operation exception for ∞—∞ (VXISI). This is a sticky bit. See Section 5.4.7.2, "Invalid Operation Exception Conditions." |
| 9 | VXIDI | Floating-point invalid operation exception for ∞—∞ (VXIDI). This is a sticky bit. See Section 5.4.7.2, "Invaild Operation Exception Conditions." |
| 10 | VXZDZ | Floating-point invalid operation exception for 0/0 (VXZDZ). This is a sticky bit. See Section 5.4.7.2, "Invalid Operation Exception Conditions." |
| 11 | VXIMZ | Floating-point invalid operation exception for ∞*0 (VXIMZ). This is a sticky bit. See Section 5.4.7.2. "Invaild Operation Exception Conditions." |
| 12 | VXVC | Floating-point invalid operation exception for invalid compare (VXVC). This is a sticky bit. See Section 5.4.7.2, "Invalid Operation Exception Conditions." |
| 13 | FR | Floating-point fraction rounded (FR). The last floating point instruction that potentially rounded the intermediate result incremented the fraction. See Section 2.5.6, "Rounding." This bit is not sticky. |
| 14 | FI | Floating-point fraction inexact (FI). The last floating-point instruction that potentially rounded the intermediate result produced an inexact fraction or a disabled overflow exception. See Section 2.5.6, "Rounding." This bit is not sticky. |
| 15–19 | FPRF | Floating-point result flags (FPRF). This field is based on the value placed into the taget register even if that value is undefined. Refer to Table 2-2 for specific bit settings.<br>15    Floating-point result class desciptor (C). Floating-point instructions other than the compare instructions may set this bit with the FPCC bits, to indicate the class of the result.<br>16–19  Floating-point condition code (FPCC). Floating-point compare instructions always set one of the FPCC bits to one and the other three FPCC bits to zero. Other floating-point instructions may set the FPCC bits with the C bit, to indicate the class of the result. Note that in this case the high-order three bits of the FPCC retain their relational significance indicating that the value is less than, greater than, or equal to zero.<br>16  Floating-point less than or negative (FL or <)<br>17  Floating-point greater than or positive (FG or >)<br>18  Floating-point equal or zero (FE or =)<br>19  Floating-point unordered or NaN (FU or ?) |
| 20 | — | Reserved |
| 21 | VXSOFT | Not implemented in the 601. This is a sticky bit. For more detailed informtion refer to Table 5–17 and Section 5.4.7.2, "Invalid Operation Exception Conditions." |
| 22 | VXSQRT | Not implemented in the 601. For more detailed information refer to Table 5–17 and Section 5.4.7.2, "Invalid Operation Exception Conditions." |
| 23 | VXCVI | Floating-point invalid operation exception for invalid integer convert (VXCVI). This is a sticky bit. See Section 5.4.7.2, "Invalid Operation Exception Conditions." |
| 24 | VE | Floating-point invalid operation exception enable (VE). See Section 5.4.7.2, "Invalid Operation Exception Conditions." |
| 25 | OE | Floating-point overflow exception enable (OE). See Section 5.4.7.4, "Overflow Exception Condition." |
| 26 | UE | Floating-point underflow exception enable (UE). This bit should not be used to determine whether denormalization should be performed on floating-point stores. See Section 5.4.7.5, "Underflow Exception Condition." |
| 27 | ZE | Floating-point zero divide exception enable (ZE.) See Section 5.4.7.3, "Zero Divide Exception Condition." |
| 28 | XE | Floating-point inexact exception enable (XE). See Section 5.4.7.6, "Inexact Exception Condition." |
| 29 | NI | Non-IEEE mode bit (NI) |
| 30–31 | RN | Floating-point rounding control (RN). See Section 2.5.6, "Rounding."<br>00  Round to nearest<br>01  Round toward zero<br>10  Round toward +infinity<br>11  Round toward −infinity |

We claim:

1. Apparatus for maintaining status flags and condition codes in a floating point unit (FPU) capable of out-of-order and speculative execution and including an instruction dispatch unit (IDU) and an instruction fetch unit (IFU) comprising;

a) a floating point queue (FPQ) for receiving speculative in-order instructions and issuing out-of-order and/or speculative instructions containing a group identifier tag (GID) and a target identifier tag (TID), the GID tag indicating a set of instructions bounded at each end by an interruptible or branch instruction; the TID tag indicative of the identity of a targeted architected facility and the program order of the instruction;

b) a floating point status and control register (FPSCR) containing status and control bits for each instruction, the FPSCR being updated when an instruction is executed and committed;

c) a FPSCR renaming mechanism for assigning an FPSCR rename to selected FPSCR bits during instruction dispatch from the IFU to the FPQ when an arithmetic instruction is dispatched that has a GID which has not been committed by the IDU and does not already have an FPSCR rename assigned, as determined by the FPQ, the FPSCR rename mechanism utilizing the TID tag upon the presence of selected bits in the FPSCR;

d) means for updating the FPSCR bits as a new arithmetic instruction enters the write-back stage in the FPU;

e) means for merging the resulting FPSCR updates of all instructions in a given GID into one FPSCR rename register; and f) means for clearing an FPSCR rename upon i) the GID assigned to the rename being committed by the IDU; ii) all renames being cleared where the renames are newer or equal to an interrupt or branch re-direction point.

2. The apparatus of claim 1 further including means for merging a plurality of floating point unit (FPU) operation status bits into a common rename register entry.

3. The apparatus of claim 1 further including a floating point register (FPR) rename mechanism coupled to an instruction bus for receiving an input instruction and group identifier and target identifier (GID and TID) tags for each instruction, the floating point register (FPR) rename mechanism providing an input to the floating point queue (FPO) for implementing register renaming by expanding the number of architected floating point registers.

4. The apparatus of claim 1 wherein the floating point status and control register (FPSCR) rename mechanism includes a matrix in juxtaposition and coupled to a merged register renaming array.

5. The apparatus of claim 4 wherein the matrix array includes a plurality of columns and rows, selected columns and rows coupled together through logic elements for identifying (i) entries in the register rename array containing a matching group identifier tag (GID) or target identifier tag (TID), (ii) entries containing a matching GID being merged in a prioritized merge logic unit, and (iii) entries containing a matching TID being cleared.

6. The apparatus of claim 5 wherein the register array contains a number of registers equal to the number of outstanding group identifier (GID) tags supported in the processor, each register defining a plurality of fields in which bits are stored indicative of a valid bit; a rename assignment and merged status bits for an instruction.

7. The apparatus of claim 6 further including logic means for merging the outputs of the matrix and array columns to provide a merge floating point status and control register (FPSCR) data bus as an input to the register array and an updated status for an architected FPSCR.

8. In a floating point unit (FPU) capable of out of order and/or speculative instruction execution and including a floating point status and control register (FPSCR), a floating point queue (FPQ), and a FPSCR rename mechanism, a method for maintaining status flags and condition codes in the out-of-order floating point execution unit comprising the steps of:

a) receiving in the floating point queue (FPQ) speculative in-order instructions and issuing out of order and speculative instructions containing a group identifier tag (GID) and a target identifier tag (TID), the GID tag indicating a set of instructions bounded at each end by an interruptible or branch instruction; the TID tag indicating the identity of a targeted architected facility and the program order of the instructions;

b) loading a floating point status and control register (FPSCR) with status and control bits for each instruction, the (FPSCR) being updated when an instruction is executed and committed;

c) assigning in the FPSCR renaming mechanism an FPSCR rename to selected FPSCR bits during instruction dispatch from an Instruction Fetch Unit (IFU) to the FPQ when an arithmetic instruction is dispatched that has a GID which has not been committed by an Instruction Dispatch Unit (IDU) and does not already have an FPSCR rename assigned, as determined by the floating point instruction queue (FPO); the FPSCR rename mechanism utilizing the TID tag upon the presence of selected bits in the FPSCR;

d) updating the FPSCR bits in the FPSCR rename as a new arithmetic instruction enters the write-back stage in the FPU;

e) merging the resulting FPSCR updates of all instructions in a given GID into one FPSCR rename register; and f) clearing an FPSCR rename upon i) the GID assigned to the rename being committed by the IDU; and ii) all renames being cleared where the renames are newer or equal to an interrupt or branch redirection point.

9. In a floating point unit (FPU) capable of executing out of order/speculative instructions containing a group identifier tag (GID) and a target identifier tag (TID), the FPU including a floating point status and control register (FPSCR), a floating point queue (FPO) and an FPSCR rename mechanism, a method for maintaining status flags and condition codes in the FPSCR comprising the steps of:

a) receiving an instruction including a TID/GID tag at the floating point queue;

b) testing the instructions to determine if the GID has not been committed and the GID does not already have an FPSCR rename assigned;

c) assigning an FPSCR rename in the event the conditions tested in step b are true;

d) testing the floating point queue to determine if an instruction should be issued to a floating execution unit;

e) a true condition initiating a test to determine if the arithmetic instruction has been executed and is in a write-back stage;

f) comparing an instruction in write-back against a committing GID from an instruction dispatch unit or a previously committed GID;

g) merging the instruction FPSCR data with an FPSCR rename entry containing the matching GID and merging with other execution unit FPSCR data if such data has a matching GID and updating the FPSCR rename entry;

h) testing to determine if a branch or interrupt condition exists to redirect the process;

i) a false condition initiating a test to determine if the FPSCR rename's GID has been committed by the instruction dispatch unit; and j) a true condition merging the FPSCR rename with other committing FPSCR rename entries and merging with one or both execution units FPSCR data if such entries have commit hit write-back and merging with the current architected FPSCR and updating the architected FPSCR and clearing the FPSCR rename entry containing the matching GID.

10. An article of manufacturing, comprising:
a computer usable medium having computer readable program code means in an out of order/floating point unit (FPU) comprising a floating point status and control register (FPSCR); a floating point queue (FPO) and a fpscr rename mechanism, the computer readable program code means in said article of manufacture comprising:

(a) computer readable program code means for receiving in the floating point queue in order/speculative instructions and issuing out of order and speculative instructions containing a group identifier tag (GID) and a target identifier tag (TID), the group identifier tag indicating a set of instructions bounded at each end by an interruptible or branch instruction; the target identifier tag indicative of the identity of a targeted architected facility and the program order of the instructions;

(b) computer readable program code means for loading the FPSCR with status and control bits for each instruction, the FPSCR being updated when an instruction is executed and committed;

(c) computer readable program code means for assigning in the FPSCR renaming mechanism a floating point status and control register rename for selected floating point status and control bits during instruction dispatch from and an Instruction Fetch Unit (IFU) to the floating point queue (FPO) when an arithmetic instruction is dispatched and the instruction has a group identifier which has not been committed by an Instruction Dispatch Unit (IDU) and does not already have a FPSCR rename assigned as determined by the FPQ; the FPSCR rename mechanism utilizing the target identifier tag (TID) upon the presence of selected bits in the FPSCR;

(d) computer readable program code means for updating the bits in the FPSCR rename as a new arithmetic instruction enters the write-back stage in the floating point unit;

(e) computer readable program code means for merging the resulting FPSCR updates of all instructions in a given group identifier into one FPSCR rename; and (f) computer readable program code means for clearing a floating point status and control register rename register upon (i) the group identifier assigned to the rename being committed by the IDU and (ii) all renames being cleared where the renames are newer or equal to an interrupt or branch redirection point.

* * * * *